March 13, 1956 — T. TROUT — 2,737,749
SOUND PRODUCING FISH LURE
Filed Nov. 14, 1952
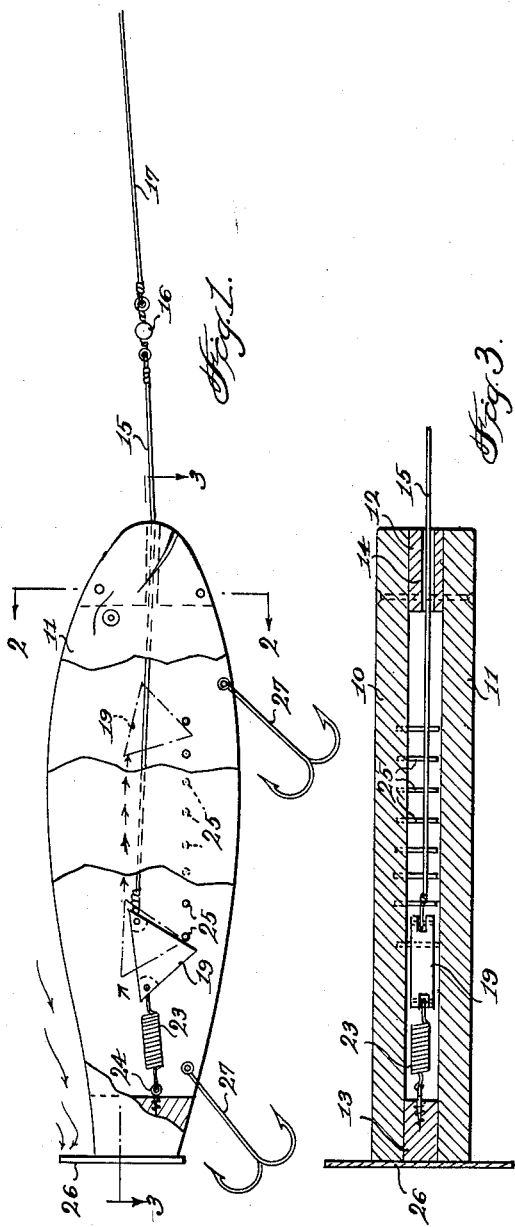
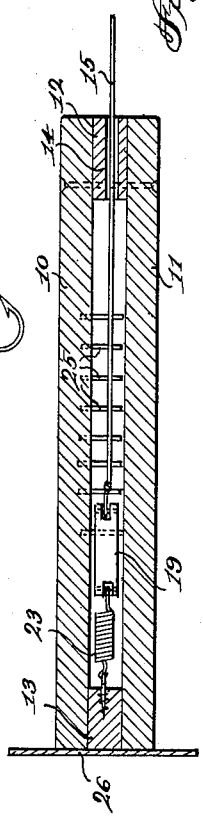
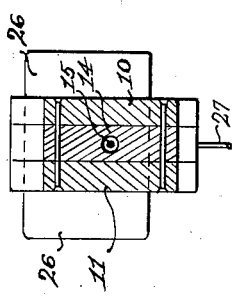
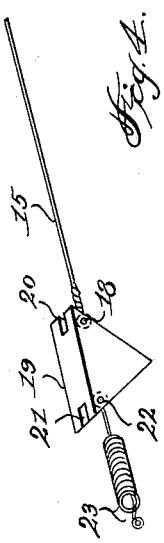
INVENTOR.
TAYLOR TROUT
BY Patrick D. Beavers

United States Patent Office 2,737,749
Patented Mar. 13, 1956

---

2,737,749

SOUND PRODUCING FISH LURE

Taylor Trout, Grant, Fla.

Application November 14, 1952, Serial No. 320,437

1 Claim. (Cl. 43—42.31)

---

The present invention relates to the art of fishing and more particularly to an improved fish lure.

It has been found in certain southern waters, particularly in Florida that fish having a plentiful natural supply of food, will never-the-less go for such food as live "pig fish." The "pig fish" produces a "grunting" sound which undoubtedly attracts other fish. However for bait, these fish are not available but for a certain season.

An important object of the present invention is to provide an artificial fish lure that produces a sound similar to that of a "pig fish" for the purpose of attracting fish that would ordinarily not be attracted by present conventional lures.

Another important object of the present invention is to provide a sound producing fish lure of simple and inexpensive construction.

Still another object of the invention is to provide a sound producing fish lure, which is positive acting and not susceptible to the ready development of defects.

These and various other objects and advantages of the invention will become apparent to the reader of the following description.

In the drawing:

Figure 1 is a side elevational view of the lure with a portion broken away to disclose the internal mechanism.

Figure 2 is a cross-section taken on line 2—2 of Figure 1.

Figure 3 is a section taken on line 3—3 of Figure 1.

Figure 4 is a fragmentary perspective view of the sound producing means.

Referring to the drawing wherein like numerals designate like parts, it can be seen, that the lure is composed of a pair of side members 10, 11 which as shown in Figure 1 have the configuration of a fish, such as a minnow.

Spacer blocks 12, 13 are interposed between the head portions of the side walls 10, 11 and the tail or rear end portions as clearly shown in Figure 3 and are held in place by pins or rivets disposed therethrough and through said side walls 10, 11.

The block 12 has an opening 14 therethrough for receiving a leader 15, the outer end of which is connected by a swivel 16 to a fishline 17.

The leader 15 extends into the lure, and between the side walls 10, 11 and connects to a cross pin 18, which passes through one corner of a triangular shaped noise producing element 19. This particular corner of the element 19 is grooved as at 20 and the leader 15 is attached to the pin 18 within this groove. An adjacent corner of the element 19 is also grooved as at 21 and a pin 22 passes across this groove and has attached thereto, one end of a coiled tension spring 23. The other end of the coiled spring 23 is attached to an eye member 24 on the tail block 13, as is shown in Figures 1 and 3.

A plurality of pins 25 are disposed in the side wall 10 and substantially bridge the space between the side walls 10 and 11. These pins are arranged in a row extending longitudinally of the lure, as is shown in Figure 1.

It can be seen that the purpose of the spring 23 is to maintain the sound producing element 19 retracted toward the tail end of the lure with the clear corner of the element 19 resting against the rearmost pin 25.

Obviously the forward outside portions of the side walls 10, 11 can be painted or otherwise decorated to resemble the head of a fish. At the tail end of the lure is provided a fin plate 26 which acts as a drag, holding the lure back in the water as it is pulled by the fishline 17.

In the use and operation of this lure, it can be seen that the leader 15 is attached by swivel 16 to the fishline 17 and then cast into the water. The lure is actuated by pulling on the line 17. For instance this lure can be used for trolling from a boat, or by fishermen in a stream. If this lure is pulled against the current, the fin 26 will act as a drag and the line will pull on the leader 15, causing the sound producing element 19 to ride over the pins 25, producing a "grunting" sound or any other desirable sound according to the materials and particular relationship of the element 19 with respect to the pins 25, with the result that game fish that ordinarily would not approach conventional lures will be attracted by the sound, especially if this sound is similar to certain fish they are accustomed to feeding upon.

It is to be understood that the metallic parts of this lure are preferably galvanized or made of some rustproof material.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A fishing lure comprising an elongated hollow body having side-walls, a front wall, and a rear wall; a spring having one end affixed to the rear wall, a vertical drag fin affixed to the rear of said body, a lead line extending slidably through the front wall, a noise-producing element interconnecting said spring and said lead line and dependent therefrom, and a row of spaced pins interposed between said side walls below and in spaced parallel relationship to said spring and lead line, said noise-producing element extending slightly below said row of pins.

References Cited in the file of this patent

UNITED STATES PATENTS

| | | |
|---|---|---|
| 1,288,382 | Cercone | Dec. 17, 1918 |
| 1,538,658 | Rindt | May 19, 1925 |
| 2,394,821 | Teagarden | Feb. 12, 1946 |
| 2,410,646 | Finn et al. | Nov. 5, 1946 |
| 2,552,730 | Miller | May 15, 1951 |
| 2,585,783 | Johnston | Feb. 12, 1952 |
| 2,690,026 | King | Sept. 28, 1954 |